(12) United States Patent
Takeuchi et al.

(10) Patent No.: US 11,192,513 B2
(45) Date of Patent: Dec. 7, 2021

(54) AIRBAG AND AIRBAG DEVICE

(71) Applicant: JOYSON SAFETY SYSTEMS JAPAN K.K., Tokyo (JP)

(72) Inventors: Shinichi Takeuchi, Shiga (JP); Kazuya Nakamura, Shiga (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 158 days.

(21) Appl. No.: 16/496,948

(22) PCT Filed: Feb. 28, 2018

(86) PCT No.: PCT/JP2018/007474
§ 371 (c)(1),
(2) Date: Sep. 23, 2019

(87) PCT Pub. No.: WO2018/180147
PCT Pub. Date: Oct. 4, 2018

(65) Prior Publication Data
US 2021/0101551 A1 Apr. 8, 2021

(30) Foreign Application Priority Data
Mar. 30, 2017 (JP) .............................. JP2017-067997

(51) Int. Cl.
*B60R 21/205* (2011.01)
*B60R 21/216* (2011.01)
*B60R 21/2338* (2011.01)

(52) U.S. Cl.
CPC .......... *B60R 21/205* (2013.01); *B60R 21/216* (2013.01); *B60R 21/2338* (2013.01); *B60R 2021/23386* (2013.01)

(58) Field of Classification Search
CPC . B60R 21/205; B60R 21/2338; B60R 21/216; B60R 2021/23386
See application file for complete search history.

(56) References Cited

U.S. PATENT DOCUMENTS 6,981,719 B2 * 1/2006 Igawa .................. B60R 21/233
280/743.1
8,360,469 B2 * 1/2013 Wiik ................. B60R 21/23138
280/743.2
(Continued)

FOREIGN PATENT DOCUMENTS

DE 10 2014 119 035 6/2015
EP 1 919 739 A1 5/2008
(Continued)

OTHER PUBLICATIONS

International Search Report on International Application No. PCT/JP2018/007474 dated May 22, 2018 (5 pages).

*Primary Examiner* — Drew J Brown
(74) *Attorney, Agent, or Firm* — Foley & Lardner LLP

(57) ABSTRACT

An airbag for a front passenger seat is configured to be inflated and expanded between the front passenger seat and an instrument panel. The airbag includes a main bag, a left sub-bag and a right sub-bag. The left sub-bag and the right sub-bag are respectively connected to a left side portion and a right side portion of the main bag. The left sub-bag and the right sub-bag are connected to each other on at least one of an upper portion, a lower portion and a front portion of the airbag.

6 Claims, 8 Drawing Sheets

(56) References Cited

U.S. PATENT DOCUMENTS

| | | | |
|---|---|---|---|
| 8,684,408 B2* | 4/2014 | Thomas | B60R 21/231 |
| | | | 280/743.2 |
| 9,505,372 B2 | 11/2016 | Yamada et al. | |
| 9,522,648 B2 | 12/2016 | Fukawatase | |
| 9,555,762 B2 | 1/2017 | Umehara et al. | |
| 9,738,243 B2* | 8/2017 | Fukawatase | B60R 21/2338 |
| 10,023,144 B2* | 7/2018 | Taguchi | B60R 21/239 |
| 10,363,898 B2* | 7/2019 | Maenishi | B60R 21/205 |
| 2006/0249943 A1* | 11/2006 | Bauer | B60R 21/231 |
| | | | 280/743.2 |
| 2010/0075426 A1 | 3/2010 | Kubo et al. | |
| 2013/0087995 A1 | 4/2013 | Lee et al. | |
| 2013/0292927 A1 | 11/2013 | Lee et al. | |
| 2014/0217707 A1* | 8/2014 | Konishi | B60R 21/213 |
| | | | 280/728.2 |
| 2014/0361521 A1 | 12/2014 | Fukawatase | |
| 2015/0166002 A1 | 6/2015 | Fukawatase | |
| 2015/0175116 A1 | 6/2015 | Cho et al. | |
| 2016/0046257 A1 | 2/2016 | Yamada et al. | |
| 2017/0129439 A1 | 5/2017 | Taguchi et al. | |
| 2017/0136981 A1 | 5/2017 | Fukawatase et al. | |
| 2017/0217397 A1 | 8/2017 | Sumiya et al. | |
| 2018/0065587 A1 | 3/2018 | Maenishi et al. | |
| 2018/0251093 A1* | 9/2018 | Rose | B60R 21/231 |
| 2018/0297550 A1* | 10/2018 | Kitagawa | B60R 21/2334 |
| 2020/0324725 A1* | 10/2020 | Jindal | B60R 21/2338 |
| 2020/0384941 A1* | 12/2020 | Kwon | B60R 21/233 |

FOREIGN PATENT DOCUMENTS

| | | |
|---|---|---|
| JP | 2000-153747 A | 6/2000 |
| JP | 2003-112593 A | 4/2003 |
| JP | 3695437 B2 | 9/2005 |
| JP | 2006-256508 A | 9/2006 |
| JP | 2008-044594 A | 2/2008 |
| JP | 2010-201980 A | 9/2010 |
| JP | 2011-062112 A | 3/2011 |
| JP | 2011-063112 A | 3/2011 |
| JP | 4870369 B2 | 2/2012 |
| JP | 2013-082418 A | 5/2013 |
| JP | 5366591 B2 | 12/2013 |
| JP | 2015-113027 A | 6/2015 |
| JP | 2016-037130 A | 3/2016 |
| JP | 2016-037137 A | 3/2016 |
| JP | 2016-040155 A | 3/2016 |
| JP | 2016-060350 A | 4/2016 |
| JP | 2017-094774 A | 6/2017 |
| JP | 6420988 B2 | 11/2018 |
| WO | WO-2008/044594 A1 | 4/2008 |
| WO | WO-2013/099036 A1 | 7/2013 |
| WO | WO-2016/002384 A1 | 1/2016 |
| WO | WO-2016/021381 A1 | 2/2016 |
| WO | WO-2016/132762 A1 | 8/2016 |
| WO | WO-2016/147684 A1 | 9/2016 |
| WO | WO-2016/147732 A1 | 9/2016 |

* cited by examiner

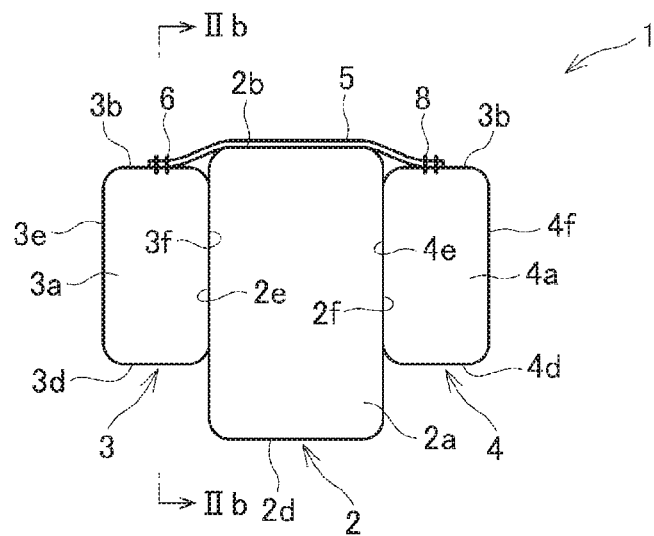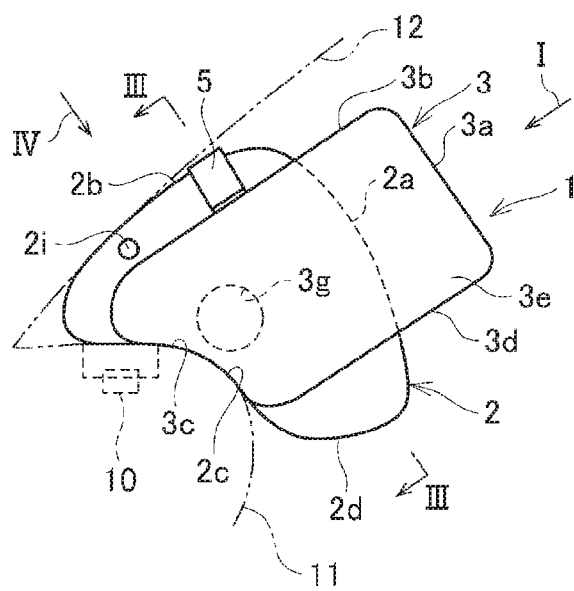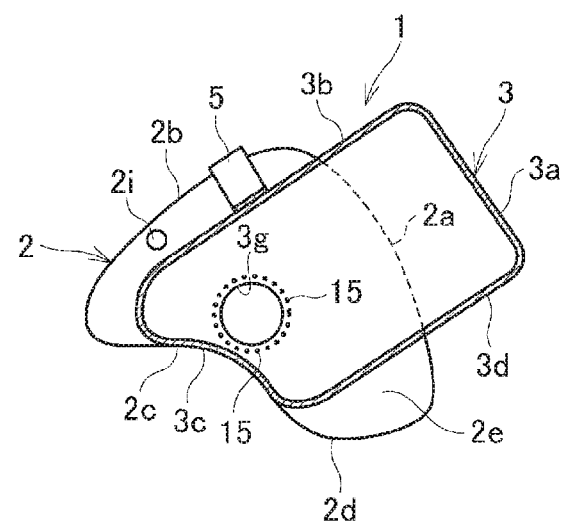

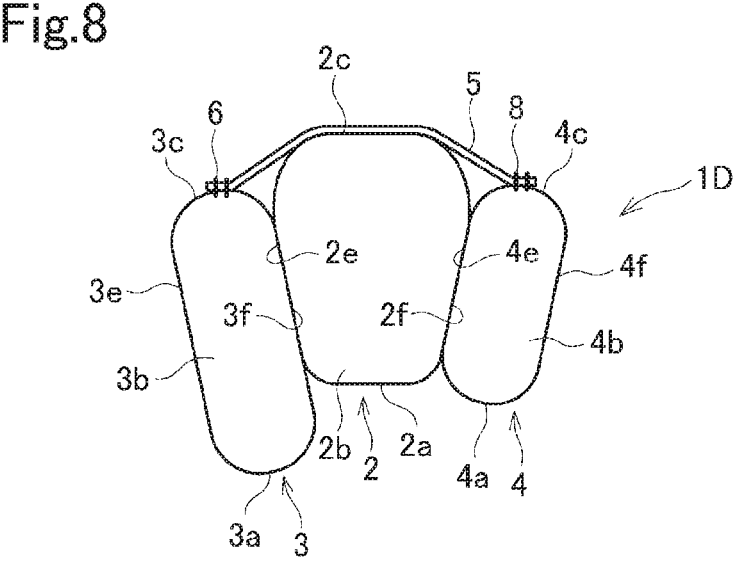

AIRBAG AND AIRBAG DEVICE

CROSS-REFERENCE TO RELATED APPLICATIONS

The present application is a national phase of International Application No. PCT/JP2018/007474 filed Feb. 28, 2018, which claims priority to Japanese Patent Application No. 2017-067997 filed Mar. 30, 2017. The contents of these applications are hereby incorporated by reference in their entireties.

TECHNICAL FIELD

The present invention relates to an airbag and an airbag device for restraining an occupant of an automobile or the like during a collision or the like. In the present invention, a front-rear direction, an upper-lower direction, and a left-right direction correspond to a vehicle front-rear direction, a vehicle upper-lower direction, and a vehicle left-right direction, unless otherwise specified.

BACKGROUND ART

There has been an airbag device that restrains a body of an occupant by inflating an airbag with an inflator at each portion around the occupant during a collision or a rollover of a vehicle body of a vehicle such as an automobile. For example, an airbag device for a front passenger seat is housed in an instrument panel, and inflates and expands an airbag in an emergency to restrain a front passenger seat occupant.

During an oblique collision or a small overlap collision of the vehicle, the front passenger seat occupant makes an inertial movement obliquely forward. Therefore, there is a need for an airbag device for a front passenger seat that restrains a front passenger seat occupant who moves obliquely forward.

CITATION LIST

Patent Literature

Patent Literature 1: WO 2013/099036
Patent Literature 2: JP-A-2015-113027
Patent Literature 3: JP-A-2010-201980
Patent Literature 4: JP-A-2000-153747
Patent Literature 5: JP-A-2006-256508
Patent Literature 6: JP-A-2003-112593
Patent Literature 7: US 2015/0175116
Patent Literature 8: JP-A-2016-037130
Patent Literature 9: JP-A-2016-037137
Patent Literature 10: JP-A-2016-040155
Patent Literature 11: JP-A-2016-060350
Patent Literature 12: WO 2016/021381 A1
Patent Literature 13: JP-A-2008-44594
Patent Literature 14: WO 2016/132762

SUMMARY OF INVENTION

The present invention has been made in view of the above related circumstances, and an object of the invention is to provide an airbag and an airbag device that are capable of restraining a front passenger seat occupant who moves obliquely forward.

The airbag according to the present invention is an airbag for a front passenger seat, which is configured to be inflated and expanded between the front passenger seat and an instrument panel, and includes: a main bag; and a left sub-bag and a right sub-bag that are respectively connected to a left side portion and a right side portion of the main bag. The left sub-bag and the right sub-bag are connected to each other on at least one of an upper portion, a lower portion and a front portion of the airbag.

In the airbag according to one aspect of the present invention, the left sub-bag and the right sub-bag are connected by a connection member.

In the airbag according to an aspect of the present invention, the connection member is disposed on an upper side of the main bag. The connection member may be connected to upper portions of the main bag, the left sub-bag, and the right sub-bag. Further, the connection member is a tie panel, and a position regulation panel which covers the tie panel and regulates a position of the tie panel may be provided at the upper portion of the main bag.

In the airbag according to an aspect of the present invention, the connection member is a tie duct, and the left sub-bag and the right sub-bag communicate with each other via the tie duct.

In the airbag according to an aspect of the present invention, the main bag and the left and right sub-bags are sewn together along at least one of the upper portion, the lower portion, and the front portion of the airbag.

In the airbag according to an aspect of the present invention, a gas is configured to flow into the left sub-bag and the right sub-bag from the main bag, so as to inflate the sub-bags.

In the airbag according to an aspect of the present invention, in a fully inflated state, at least a portion of a rear portion of one of the sub-bags on a vehicle center side is located further rearward from the main bag.

In the airbag according to an aspect of the present invention, in the fully inflated state, at least a rear end portion of an upper portion of the one of the sub-bags on the vehicle center side is located further rearward from the main bag.

In the airbag according to an aspect of the present invention, in the fully inflated state, the main bag has a maximum width portion having a maximum left-right width on a front side relative to a middle portion in a vehicle front-rear direction, and the left-right width of the main bag gradually decreases from the maximum width portion toward a rear side.

An airbag device according to the present invention includes the airbag according to the present invention, and an inflator configured to supply a gas to the main bag.

Advantageous Effects of Invention

In the present invention, a left sub-bag and a right sub-bag are connected to each other on at least one of an upper portion, a lower portion and a front portion of an airbag, and thus a front passenger seat occupant who moves obliquely forward due to an oblique collision or the like is restrained by the sub-bags or by the sub-bags and a main bag.

According to one aspect of the present invention, in a fully inflated state, at least a portion of a rear portion of the sub-bag on a vehicle center side protrudes further rearward from a rear portion of the main bag. The front passenger seat occupant who moves obliquely forward to the vehicle center side due to the oblique collision or the like is restrained by the rear portion of the sub-bag and the rear portion of the main bag.

BRIEF DESCRIPTION OF DRAWINGS

FIG. 1 is a front view (a view taken along Arrow I in FIG. 2A) of an airbag device according to a first embodiment.

FIG. 2A is a side view of the airbag according to the embodiment. FIG. 2B is a sectional view taken along a line IIb-IIb of FIG. 1.

FIG. 8 is a top view of an airbag according to a fifth embodiment.

DESCRIPTION OF EMBODIMENTS

Figure 3:
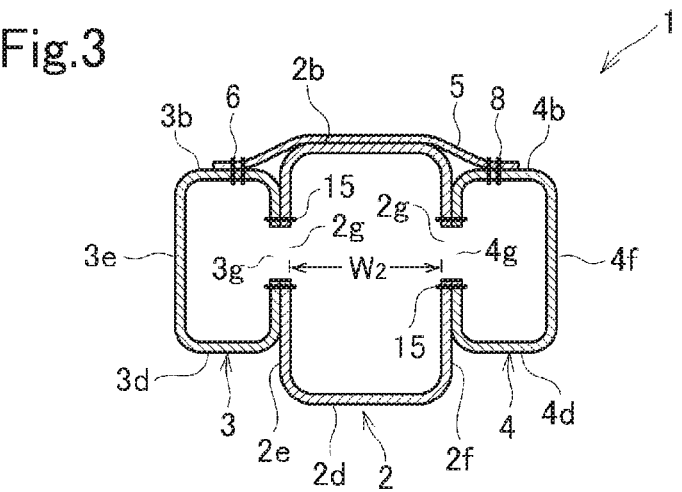
FIG. 3 is a sectional view taken along a line III-III of FIG. 2A.
Figure 4:
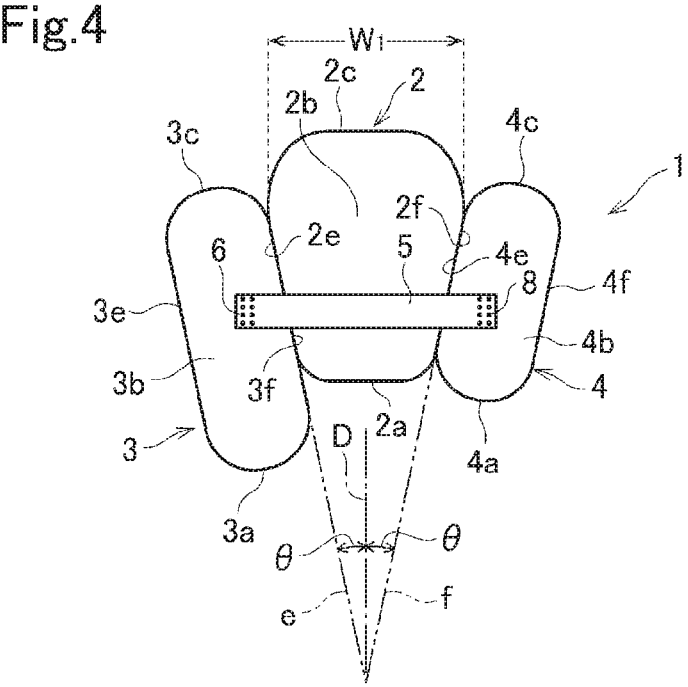
FIG. 4 is a top view (a view taken along Arrow IV in FIG. 2A) showing the airbag according to the first embodiment.

Hereinafter, an airbag device according to a first embodiment will be described with reference to FIGS. 1 to 4 and FIG. 10.

The airbag device according to the embodiment includes an airbag 1 that is normally folded and is inflated and expanded in an emergency, and an inflator 10 (FIG. 2a) that supplies a gas to the airbag 1. The airbag device is an airbag device for a front passenger seat, and is housed in an instrument panel 11 disposed in front of the front passenger seat. The airbag 1 is inflated and expanded in a space surrounded by an occupant P (FIG. 10), the instrument panel 11, and a windshield 12.

The airbag 1 includes a main bag 2, a sub-bag 3 connected to a left side surface portion of the main bag 2, and a sub-bag 4 connected to a right side surface portion of the main bag 2. In the embodiment, an automobile is a left hand drive vehicle, and the front passenger seat is a right seat. A left side surface of the airbag 1 is a side surface of the airbag 1 on a vehicle body center side. When mounted on a right hand drive vehicle, the airbag 1 is configured to be bilaterally symmetrical with respect to the figure.

The main bag 2 is inflated and expanded substantially in front of the occupant P. The main bag 2 has a rear portion 2a, an upper portion 2b, a front portion 2c, a lower portion 2d, a left side portion 2e, and a right side portion 2f. The rear portion 2a of the main bag 2 is substantially rectangular in a front view, and faces an upper body including a head of the occupant P when the airbag 1 is fully inflated and expanded.

An insertion opening of the inflator 10 is provided at the lower portion 2d of the main bag 2, and the gas is supplied from the inflator 10 into the main bag 2.

The left side portion 2e and the right side portion 2f are provided with communication openings 2g and vent holes 2i. A diameter of the communication openings 2g is larger than a diameter of the vent holes 2i. The vent holes 2i are located above the sub-bags 3 and 4, so that the expanded sub-bags 3 and 4 do not block the corresponding vent holes 2i.

The sub-bag 3 has a rear portion 3a, an upper portion 3b, a front portion 3c, a lower portion 3d, a left side portion 3e, and a right side portion 3f, and the sub-bag 4 has a rear portion 4a, an upper portion 4b, a front portion 4c, a lower portion 4d, a left side portion 4e, and a right side portion 4f.

A communication opening 3g is provided in the right side portion 3f of the left sub-bag 3 and a communication opening 4g is provided in the left side portion 4e of the right sub-bag 4. A diameter of the communication openings 3g and 4g is approximately the same as the diameter of the communication openings 2g. In a state where the communication opening 3g of the sub-bag 3 and the communication opening 4g of the sub-bag 4 are respectively matched with the left communication opening 2g and the right communication opening 2g of the main bag 2, peripheries of the communication openings 2g and 3g are coupled to each other by a sewing thread 15, and peripheries of the communication openings 2g and 4g are coupled to each other by a sewing thread 15. As a result, the sub-bags 3 and 4 are connected to the main bag 2.

In the embodiment, a tie panel 5 serving as a connection member is disposed from the upper portion of the left sub-bag 3 through the upper portion of the main bag 2 to the upper portion of the right sub-bag 4, and is sewn to an upper surface of the left sub-bag 3 and to an upper surface of the right sub-bag 4 respectively by sewing threads 6 and 8. In the present embodiment, the tie panel 5 is only coupled to the upper portions of the sub-bags 3 and 4 without being coupled to the upper portion of the main bag 2. Alternatively, the tie panel 5 may be sewn to an upper surface of the main bag 2 by a sewing thread.

In the embodiment, the rear portion 3a of the left sub-bag 3 is located further rearward from the rear portion 2a of the main bag 2 by about 10 cm to 30 cm in a state where the airbag 1 is fully inflated. The rear portion 4a of the right sub-bag 4 is flush with the rear portion 2a of the main bag 2 or is located slightly further rearward from the rear portion 2a of the main bag 2 (for example, by about 10 cm or less) in the state where the airbag 1 is fully inflated.

In the airbag 1 in the fully inflated state, a rear portion of the upper portion 3b of the sub-bag 3 and a rear portion of the upper portion 4b of the sub-bag 4 are located slightly below a rear portion of the upper portion 2b of the main bag 2, and are located above a head H (FIG. 10) of the occupant P having a standard body shape. In the airbag 1 in the fully inflated state, a rear portion of the lower portion 3d of the sub-bag 3 and a rear portion of the lower portion 4d of the sub-bag 4 are located above a rear portion of the lower portion 2d of the main bag 2. In the airbag 1 in the fully inflated state, the rear portion of the lower portion 3d of the sub-bag 3 and the rear portion of the lower portion 4d of the sub-bag 4 are located above a shoulder S (FIG. 10) of the occupant P having the standard body shape, and are located below the head H.

In the embodiment, as shown in the top view (FIG. 4) in the fully inflated state, the main bag 2 has a maximum width in a left-right direction (a maximum width portion $W_1$) on a front portion side relative to the middle in the front-rear direction. A width in the left-right direction on a front side relative to the maximum width portion $W_1$ becomes smaller frontward.

The left-right width of the main bag 2 gradually becomes smaller toward the rear from the maximum width portion $W_1$. An intersection angle θ between a rear extension line e of the left side portion 2e of the main bag 2 and a vehicle front-rear direction D and between a rear extension line f of the right side portion 2f of the main bag 2 and the vehicle front-rear direction D is, for example, about 10 degrees to 30 degrees (deg).

In the fully inflated state, a distance $W_2$ (FIG. 3) between the left and right communication openings 2g of the main bag 2 is about 25 cm to 50 cm.

When the inflator 10 is operated, the gas is supplied from the inflator 10 into the main bag 2. The gas supplied into the main bag 2 is supplied into the sub-bags 3 and 4 through the communication openings 2g, 3g and 4g. Accordingly, the main bag 2 and the sub-bags 3 and 4 are inflated and expanded.

In the embodiment, the maximum width portion $W_1$ of the front portion of the main bag 2 is increased, so that support of the airbag 1 by the instrument panel 11 is stabilized. The left-right width of the main bag 2 is decreased toward a rear side and toward a front side from the maximum width portion $W_1$, so that a volume of the main bag 2 can be reduced.

In the embodiment, the sub-bags 3 and 4 are connected to the main bag 2 by the sewing threads 15. A length from the communication opening 3g of the left sub-bag 3 to the communication opening 4g of the right sub-bag 4 is substantially equal to a length between the left and right communication openings 2g of the main bag 2. Therefore, in the fully inflated state, side surface portions of the main bag 2 are in close contact with the sub-bags 3 and 4.

During a frontal collision, the occupant is restrained by the main bag 2 and the sub-bags 3 and 4.

Figure 10:
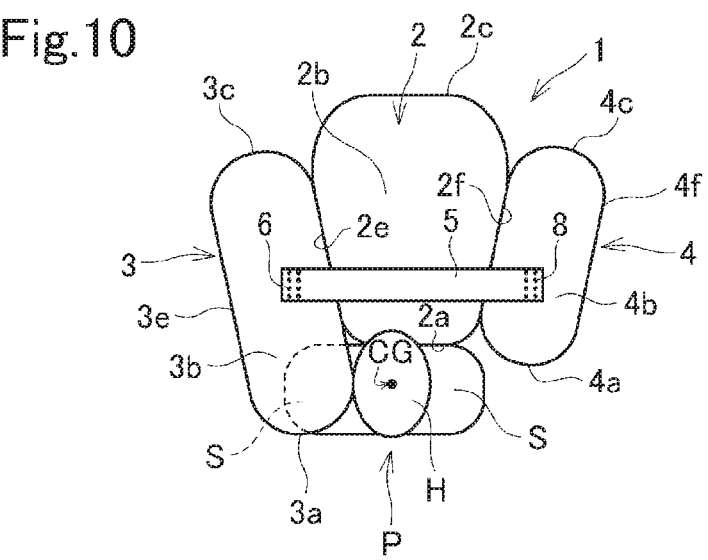
FIG. 10 is a top view of an airbag when an occupant is restrained.

Ina case of an oblique collision or a small overlap collision on a left side of the vehicle, the occupant P moves obliquely leftward as shown in FIG. 10 and is restrained by the sub-bag 3 and the main bag 2.

The rear portion 3a of the sub-bag 3 is located further rearward from the rear portion 2a of the main bag 2. As shown in FIG. 10, when the head H of the occupant P is restrained by the rear portion 2a of the main bag 2, the rear portion 3a of the sub-bag 3 is preferably located further rearward from a center of gravity CG of the head H. For example, the rear portion 3a of the sub-bag 3 is located further rearward from the rear portion 2a of the main bag 2 by about 10 cm to 30 cm. Accordingly, the sub-bag 3 can prevent rotation (clockwise rotation in FIG. 10) of the head H about the center of gravity CG. In particular, in the embodiment, since the upper portion of the left sub-bag 3 and the upper portion of the right sub-bag 4 are connected to each other by the tie panel 5, when the occupant P pushes a rear portion side of the left sub-bag 3 left-obliquely forward in the case of the oblique collision or the small overlap collision on the left side of the vehicle, the left sub-bag 3 is prevented from separating from the main bag 2.

In a case of an oblique collision or a small overlap collision to the right of the vehicle, the occupant P is restrained by the main bag 2 and the sub-bag 4.

In the embodiment, since a matching surface between the side surface portion of the main bag 2 and the sub-bag 3 extends in a direction intersecting the vehicle front-rear direction D so as to be closer to a center side of the main bag 2 toward the rear side, the head H of the occupant P who moves obliquely forward can be restrained by being inserted between the side surface portions of the main bag 2 and the sub-bags 3 and 4.

Figure 5:
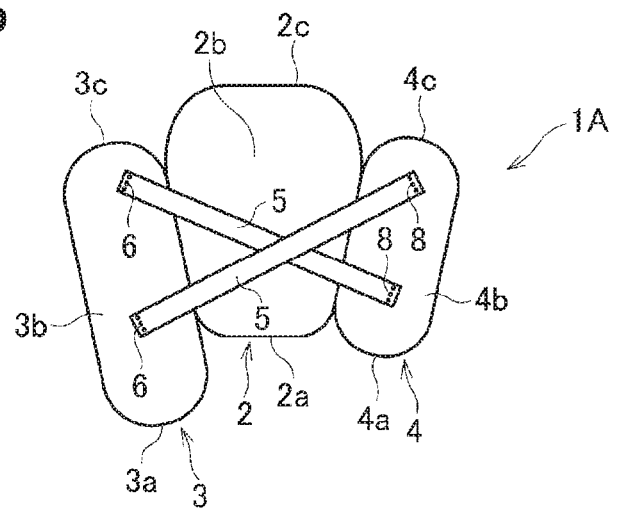
FIG. 5 is a top view of an airbag according to a second embodiment.

In the above embodiment, the upper surface of the sub-bag 3 and the upper surface of the sub-bag 4 are connected to each other by one tie panel 5. Alternatively, the number of the tie panels 5 may be two or more. When two or more tie panels 5 are provided, for example, as an airbag 1A shown in FIG. 5, the tie panels 5 may be disposed to intersect with each other.

Figure 6:
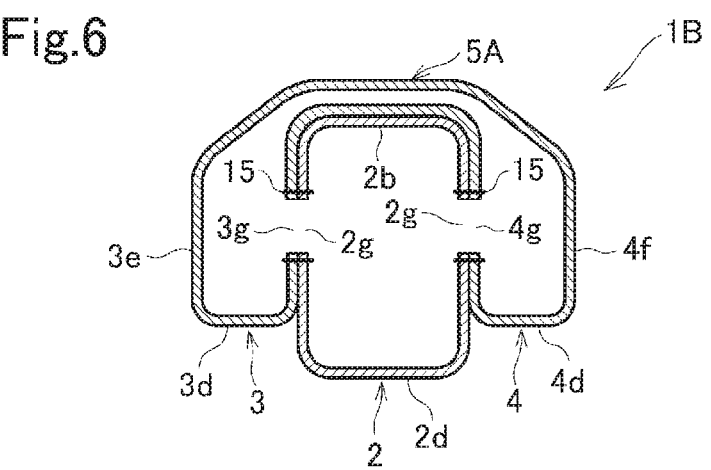
FIG. 6 is a sectional view of an airbag according to a third embodiment.

In the above embodiments, the belt-shaped tie panel 5 is used as the connection member. Alternatively, a tie duct 5A having a long tubular shape may be used as in an airbag 1B of FIG. 6, one end side of the tie duct 5A may communicate with the left sub-bag 3, and another end side may communicate with the right sub-bag 4. Other configurations of the airbag 1A and the airbag 1B are the same as those of the airbag 1.

In the above embodiments, the upper portion of the left sub-bag 3 and the upper portion of the right sub-bag 4 are connected to each other by the tie panel 5 or the tie duct 5A. It should be noted that in the present invention, the lower portion, the front portion, or the rear portion of the sub-bag 3 may be connected to the lower portion, the front portion, or the rear portion of the sub-bag 4 by the tie panel 5 or the tie duct 5A. In the present invention, upper side surfaces of the sub-bags 3 and 4 may be respectively sewn to an upper side surface of the main bag 2 by sewing threads, so that the upper portion of the sub-bag 3 and the upper portion of the sub-bag 4 may be connected to each other via the main bag 2.

Examples of these embodiments are shown in FIGS. 7 and 8, and FIGS. 9A to 9C.

Figure 7:
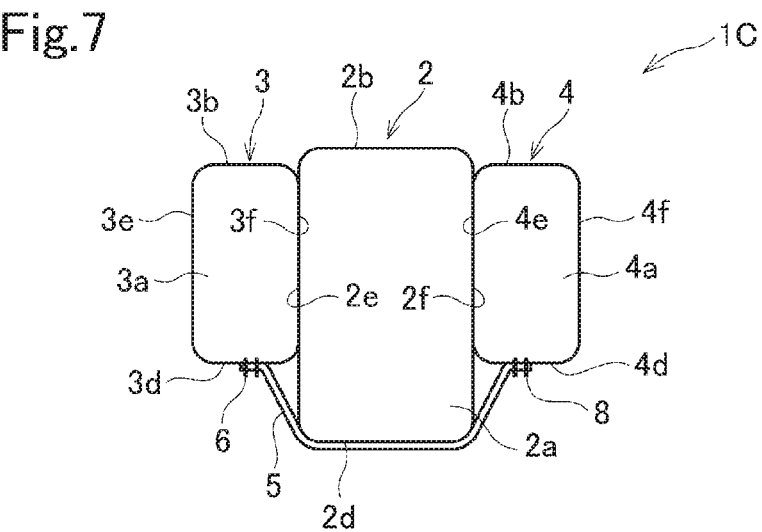
FIG. 7 is a top view of an airbag according to a fourth embodiment.

In an airbag 1C of FIG. 7, a lower portion of the left sub-bag 3 and a lower portion of the right sub-bag 4 are connected to each other by the tie panel 5. The tie panel 5 may or may not be connected to the main bag 2.

In an airbag 1D of FIG. 8, a front portion 3C of the left sub-bag 3 and a front portion 4C of the right sub-bag 4 are connected to each other by the tie panel 5. The tie panel 5 may or may not be connected to the main bag 2.

In FIGS. 7 and 8, the tie duct may be used instead of the tie panel.

Figure 9A:
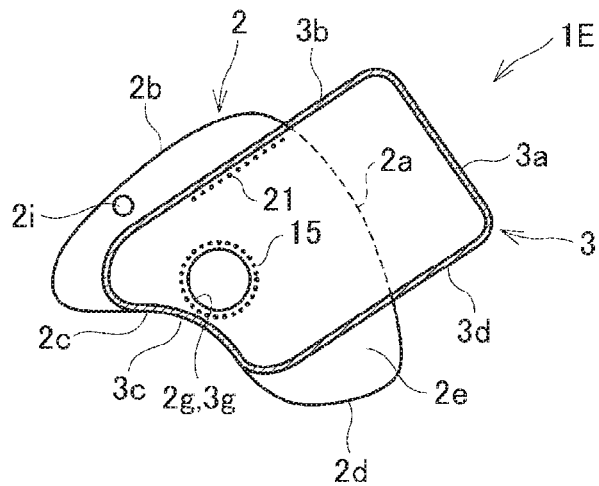
FIGS. 9A, 9B, and 9C are sectional views of an airbag according to a sixth embodiment.
Figure 9B:
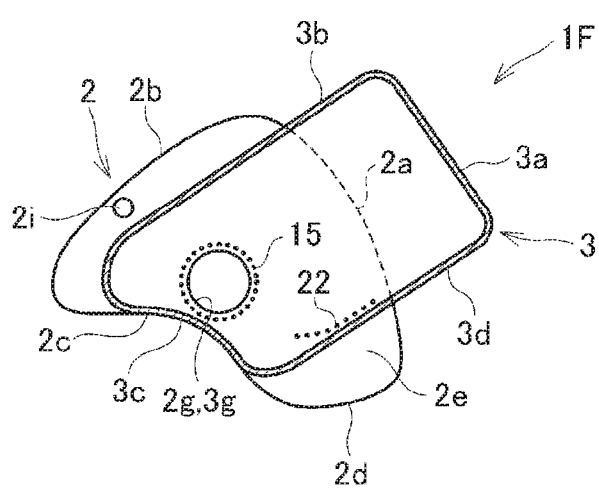
Figure 9C:
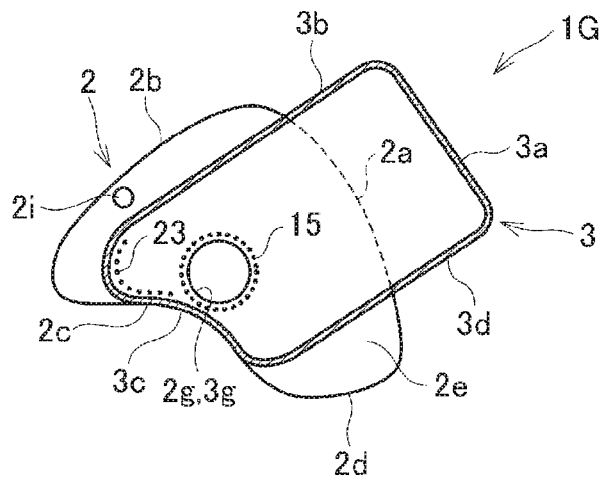

In airbags 1E, 1F, and 1G of FIGS. 9A to 9C each, a side surface of the left sub-bag 3 and a side surface of the right sub-bag 4 are sewn to corresponding side surfaces of the main bag 2 by sewing threads. In FIG. 9A, sewing threads 21 are provided along upper portions of the sub-bags 3 and 4. In FIG. 9B, sewing threads 22 are provided along lower portions of the sub-bags 3 and 4. In FIG. 9C, a sewing thread 23 is provided along a front portion of the main bag 2. Two or three of the upper sewing threads 21, the lower sewing threads 22, and the front sewing thread 23 may be provided.

Figure 11:
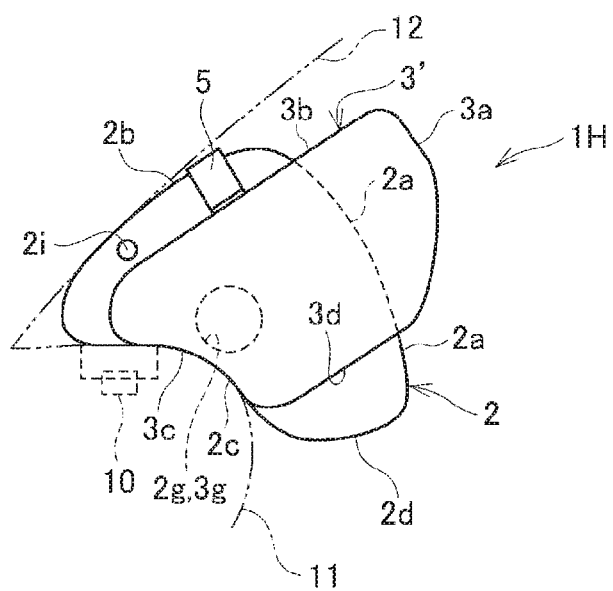
FIG. 11 is a side view of an airbag according to a seventh embodiment.

In the present invention, as in a sub-bag 3' of an airbag 1H of FIG. 11, an upper portion side of the sub-bag 3' at a vehicle center side may protrude further rearward from a lower portion side.

Figure 12:
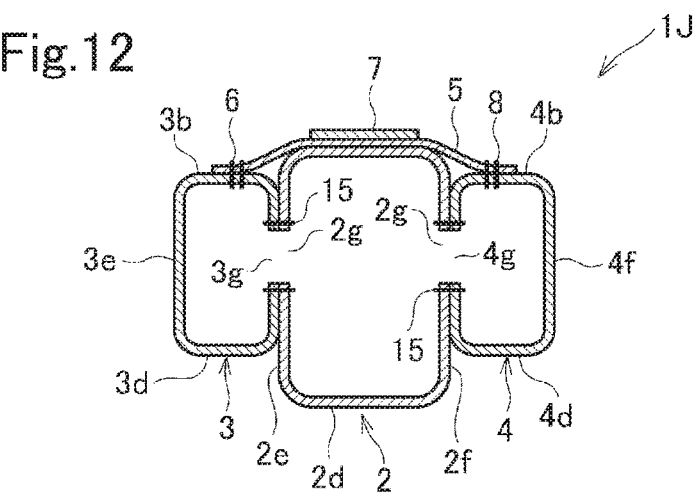
FIG. 12 is a sectional view of an airbag according to an eighth embodiment.
Figure 13:
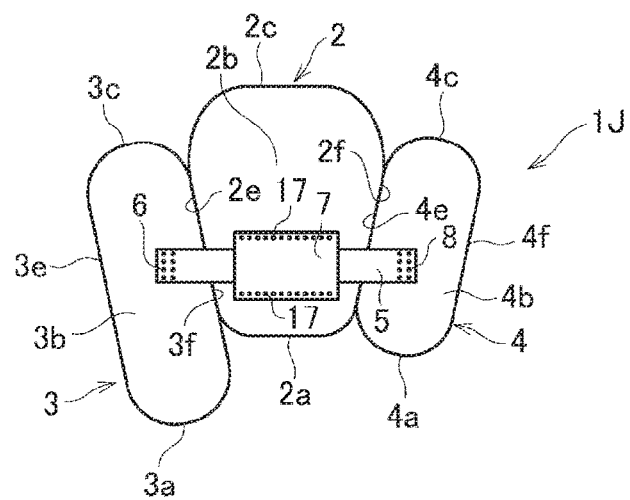
FIG. 13 is a top view of the airbag according to the eighth embodiment.

As in an airbag 1J in FIGS. 12 and 13, a position regulation panel 7 may be provided on the upper portion of the main bag 2 to cover the tie panel 5. The position regulation panel 7 has a rectangular shape, and has two sides that extend in the front-rear direction, and two sides that extend in the left-right direction. Side edge portions of the two sides that extend in the left-right direction are sewn to the upper surface of the main bag 2 by sewing threads 17. The two sides of the position regulation panel 7 that extend along the front-rear direction are not sewn. The tie panel 5 is inserted between the main bag 2 and the position regulation panel 7. A position of the tie panel 5 can be regulated by providing the position regulation panel 7.

Figure 14:
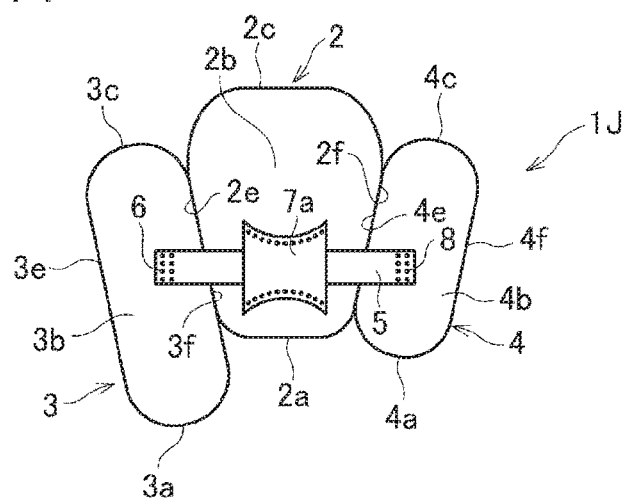
FIG. 14 is a top view of an airbag according to a ninth embodiment.
Figure 15:
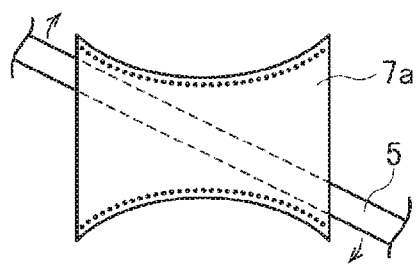
FIG. 15 is a top view of a position regulation panel.

The position regulation panel 7 is not limited to having a rectangular shape, and may be, for example, a position regulation panel 7a that has a shape in which a width in the front-rear direction gradually narrows toward a center portion in the left-right direction, as shown in an airbag 1K of FIG. 14. As shown in FIG. 15, the position regulation panel 7a has a small load from the tie panel 5 that moves along with a swing or the like of the left sub-bag 3 or the right sub-bag 4, and a freedom degree of bag behavior of the airbag 1K is high.

Other configurations of the airbags 1C to 1K are the same as those of the airbag 1.

The present invention is not limited to the above-described embodiments, and various modifications can be made without departing from the scope of the present invention. For example, in the present invention, a curvature of an inflated sub-chamber may be increased by putting a tack on panels that constitute the sub-bag. In addition, the curvature of the inflated sub-chamber may be increased by providing a grip portion on one panel that faces the main bag among the panels that constitute the sub-bag. The sub-chamber may be configured by sewing together edges of a plurality of panels, and may be configured by folding back one panel and sewing the edges together. The sub-chamber may have a shape other the ones shown in the drawings, such as a cylindrical shape.

This application is based on Japanese patent application 2017-067997, filed Mar. 30, 2017, which is incorporated by reference in its entirety.

REFERENCE SIGNS LIST 1, 1A to 1H, 1J, 1K airbag
2 main bag
3, 3', 4 sub-bag
5 tie panel
5A tie duct
7, 7a position regulation panel
10 inflator
11 instrument panel
12 windshield

The invention claimed is:

1. An airbag for a front passenger seat, which is configured to be inflated and expanded between the front passenger seat and an instrument panel, the airbag comprising:
a main bag; and
a left sub-bag and a right sub-bag that are respectively connected to a left side portion and a right side portion of the main bag, wherein
the left sub-bag and the right sub-bag are connected to each other on at least one of an upper portion, a lower portion and a front portion of the airbag,
the left sub-bag and the right sub-bag are connected by a tie panel provided at an upper side of the main bag, and a position regulation panel which is a rectangular shape and which covers the tie panel and regulates a position of the tie panel is provided at the upper side of the main bag,
the tie panel is provided to contact with the upper side of the main bag, is connected to upper portions of the left sub-bag and the right sub-bag and is not connected to the main bag, and the airbag is configured so that a gas flows into the left sub-bag and the right sub-bag from the main bag so as to inflate the left sub-bag and the right sub-bag, and,
the position regulation panel of the rectangular shape has two sides that extend in a front-rear direction and two sides that extend in a left-right direction, and side edge portions of the two sides that extend in the left-right direction are connected to an upper surface of the main bag, and side edge portions of the two sides that extend in the front-rear direction are not connected to the upper surface of the main bag.

2. The airbag according to claim 1, wherein
a gas is configured to flow into the left sub-bag and the right sub-bag from the main bag, so as to inflate the sub-bags.

3. The airbag according to claim 1, wherein
in a fully inflated state, at least a portion of a rear portion of one of the sub-bags on a vehicle center side is located further rearward from the main bag.

4. The airbag according to claim 3, wherein
in the fully inflated state, at least a rear end portion of an upper portion of the one of the sub-bags on the vehicle center side is located further rearward from the main bag.

5. The airbag according to claim 1, wherein
in the fully inflated state, the main bag has a maximum width portion having a maximum left-right width on a front side relative to a middle portion in a vehicle front-rear direction, and wherein
the left-right width of the main bag gradually decreases from the maximum width portion toward a rear side.

6. An airbag device comprising:
the airbag according to claim 1; and
an inflator configured to supply a gas to the main bag.

* * * * *